United States Patent
Sosa

(10) Patent No.: US 8,233,788 B2
(45) Date of Patent: Jul. 31, 2012

(54) ILLUMINATION DEVICE FOR PHOTOGRAPHY AND PHOTOGRAPHIC DEVICE

(75) Inventor: Toshio Sosa, Narashino (JP)

(73) Assignee: Nikon Corporation, Tokyo (JP)

( * ) Notice: Subject to any disclaimer, the term of this patent is extended or adjusted under 35 U.S.C. 154(b) by 165 days.

(21) Appl. No.: 12/385,544

(22) Filed: Apr. 10, 2009

(65) Prior Publication Data

US 2009/0269047 A1    Oct. 29, 2009

(30) Foreign Application Priority Data

Apr. 23, 2008   (JP) ................................. 2008-112976

(51) Int. Cl.
*G03B 15/03*    (2006.01)
(52) U.S. Cl. ........................................................ 396/164
(58) Field of Classification Search .................. 396/164, 396/182, 205, 206; 348/370, 371
See application file for complete search history.

(56) References Cited

U.S. PATENT DOCUMENTS

| | | | | |
|---|---|---|---|---|
| 3,438,766 A | * | 4/1969 | Biber | 396/106 |
| 3,846,811 A | * | 11/1974 | Nakamura et al. | 396/61 |
| 7,929,854 B2 | * | 4/2011 | Homma | 396/164 |
| 2009/0102964 A1 | * | 4/2009 | Yuyama et al. | 348/371 |
| 2010/0183289 A1 | * | 7/2010 | Homma | 396/164 |
| 2010/0285837 A1 | * | 11/2010 | Kalevo et al. | 455/556.1 |

FOREIGN PATENT DOCUMENTS

| | | |
|---|---|---|
| JP | A-2000-338572 | 12/2000 |
| WO | WO 2006/088039 A1 | 8/2006 |

* cited by examiner

*Primary Examiner* — W. B. Perkey
(74) *Attorney, Agent, or Firm* — Oliff & Berridge, PLC

(57) ABSTRACT

An illumination device for photography which can photograph an image expressing a movement of the object is provided. The device comprises a light emission unit which emits, continuously and at an constant emission amount, an illumination light, and a light emission control unit which controls the emission unit and changes a light emission intensity during the acquisition of a single still image by exposing object light on an imaging unit provided in a photographic device, wherein the light emission control unit, during the acquisition of the single still image, causes the illumination light to emit continuously at a first light emission intensity in a first time period, and causes the illumination light to emit continuously at a second light emission intensity with a lower intensity than the first light emission intensity in a second time period after the elapse of the first time period.

8 Claims, 11 Drawing Sheets

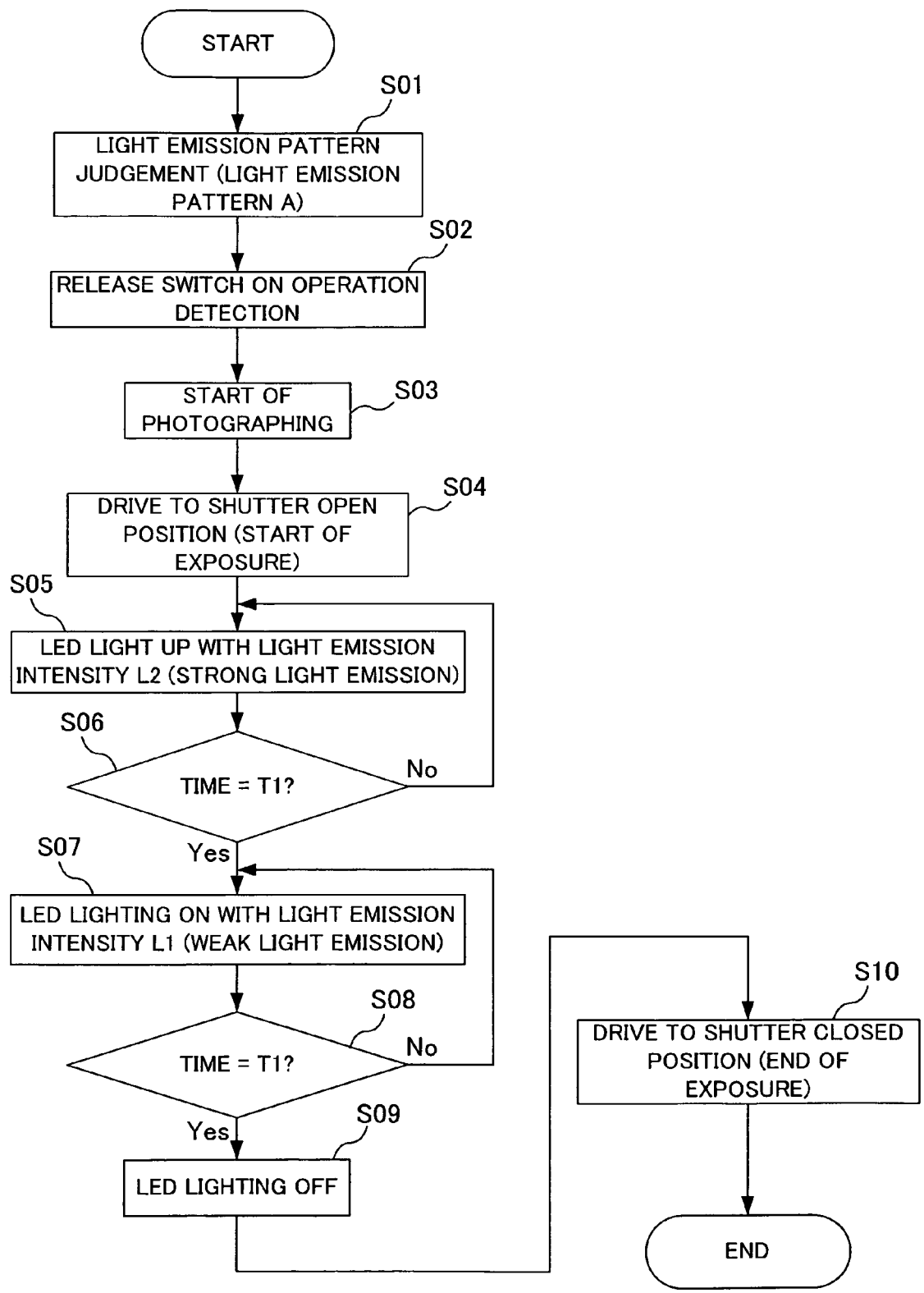

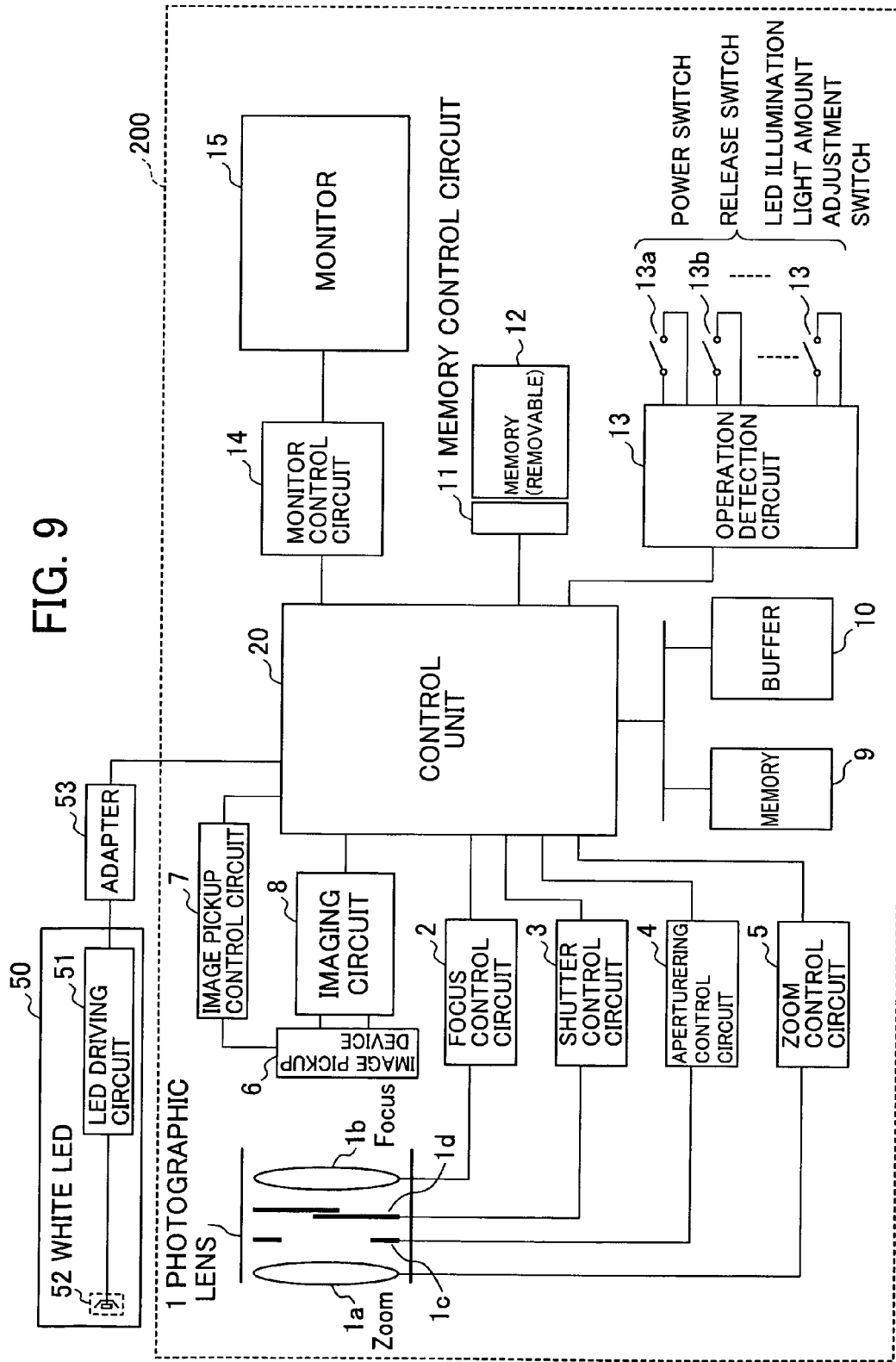

ILLUMINATION DEVICE FOR PHOTOGRAPHY AND PHOTOGRAPHIC DEVICE

The present application claims priority under 35 U.S.C. §119 to Japanese Patent Application No. 2008-112976 filed on Apr. 23, 2008. The content of the application is incorporated herein by reference in its entirety.

BACKGROUND OF THE INVENTION

1. Field of the Invention

The present invention relates to an illumination device for photography, and a photographic device.

2. Description of the Related Art

In the prior art, as a photographic device, a camera or the like which is capable of photographing with what is referred to as "rear synchronization mode" is known. In the mode, illumination light is emitted immediately before the end of the exposure (for example, Japanese Unexamined Patent Publication No. 2000-338572).

SUMMARY OF THE INVENTION

If a car is photographed with the rear synchronization mode using the camera of the disclosure of the above Patent Document 1, the direction of movement of the car can be expressed by the trails of the tail lights, but because the car itself is photographed in a still state, it is difficult to express a movement of the car itself.

The problem to be solved by the present invention is to provide an illumination device for photography, and a photographic device, which can photograph an image which expresses a movement of the object.

The present invention solves the above problem by the following means.

In order to achieve the object mentioned above, according to a first aspect of the present invention, an illumination device for photography is provided. The illumination device for photography comprising, a light emission unit which emits, continuously and at an approximately constant light emission amount, an illumination light for photography; and a light emission control unit which controls the light emission unit and changes a light emission intensity of the illumination light during the acquisition of a single still image by exposing object light on an imaging unit provided in a photographic device, wherein the light emission control unit, during the acquisition of the single still image, causes the illumination light to emit continuously at a first light emission intensity in a first time period, and causes the illumination light to emit continuously at a second light emission intensity with a lower intensity than the first light emission intensity in a second time period after the elapse of the first time period.

The light emission unit may comprise a first light emission unit which is capable of emitting the illumination light at the first light emission intensity, and a second light emission unit which is capable of emitting the illumination light at the second light emission intensity, and the light emission control unit causes either of the first light emission unit and the second light emission unit to emit.

The light emission control unit, during the acquisition of the single still image, may cause the illumination light to emit continuously with a light emission intensity which differs from the second light emission intensity, in a third time period after the elapse of the second time period.

The light emission unit may be provided such that a plurality of different colors are selectable as a color of the emitted illumination light, and the light emission control unit also changes the color of the illumination light when it changes the light emission intensity of the illumination light.

The light emission unit may comprise a light emitting diode as a light emitting element.

In order to achieve the object mentioned above, according to a second aspect of the present invention, a photographic device comprises the illumination device for photography according to the first aspect is provided.

In order to achieve the object mentioned above, according to a third aspect of the present invention, a photographic device to which an illumination device for photography which emits illumination light for photography at an approximately constant light emission amount can be connected is provided. The photographic device comprises a communication unit which carries out communication with the connected illumination device for photography, and a light emission control unit which controls the illumination device for photography via the communication unit, and changes a light emission intensity of the illumination light during the acquisition of a single still image by exposing object light on an imaging unit, wherein the light emission control unit, during the acquisition of the single still image, causes the illumination light to emit continuously at a first light emission intensity in a first time period, and causes the illumination light to emit continuously at a second light emission intensity with a lower intensity than the first light emission intensity in a second time period after the elapse of the first time period.

In order to achieve the object mentioned above, according to a fourth aspect of the present invention, a photographic device to which an illumination device for photography which emits illumination light for photography at an approximately constant light emission amount can be connected is provided. The photographic device comprises a communication unit which carries out communication with the connected illumination device for photography, a built-in illumination device for photography which is capable of emitting illumination light for photography at a different light emission intensity from the connected illumination device for photography; and a light emission control unit provided to be capable of controlling the connected illumination device for photography and the built-in illumination device for photography, and by causing either of the connected illumination device for photography and the built-in illumination device for photography to emit, changes a light emission intensity of the illumination light during the acquisition of a single still image by exposing object light on an imaging unit, wherein, the connected illumination device for photography and the built-in illumination device for photography are each capable of emitting the illumination light continuously and at an approximately constant emission amount, and the light emission control unit, during the acquisition of the single still image, causes one of the connected illumination device for photography and the built-in illumination device for photography to emit illumination light continuously at a first light emission intensity in a first time period, and causes the other one of the connected illumination device for photography and the built-in illumination device for photography to emit illumination light continuously at a second light emission intensity with a lower intensity than the first light emission intensity in a second time period after the elapse of the first time period.

According to the present invention, it is possible to provide an illumination device for photography and a photographic device which can photograph an image expressing a movement of the object, in particular, an effect such as that known as front curtain synchronization.

BRIEF DESCRIPTION OF THE DRAWINGS

FIG. 8 is a flowchart showing the light emission control carried out by the control unit provided in the camera of FIG. 1;

FIG. 9 is a block diagram showing the constitution of the camera of the second embodiment;

DETAILED DESCRIPTION OF THE PREFERRED EMBODIMENTS

First Embodiment

Below, a camera provided with the first embodiment of the illumination device for photography to which the present invention is applied will be explained with reference to the drawings.

Figure 1:
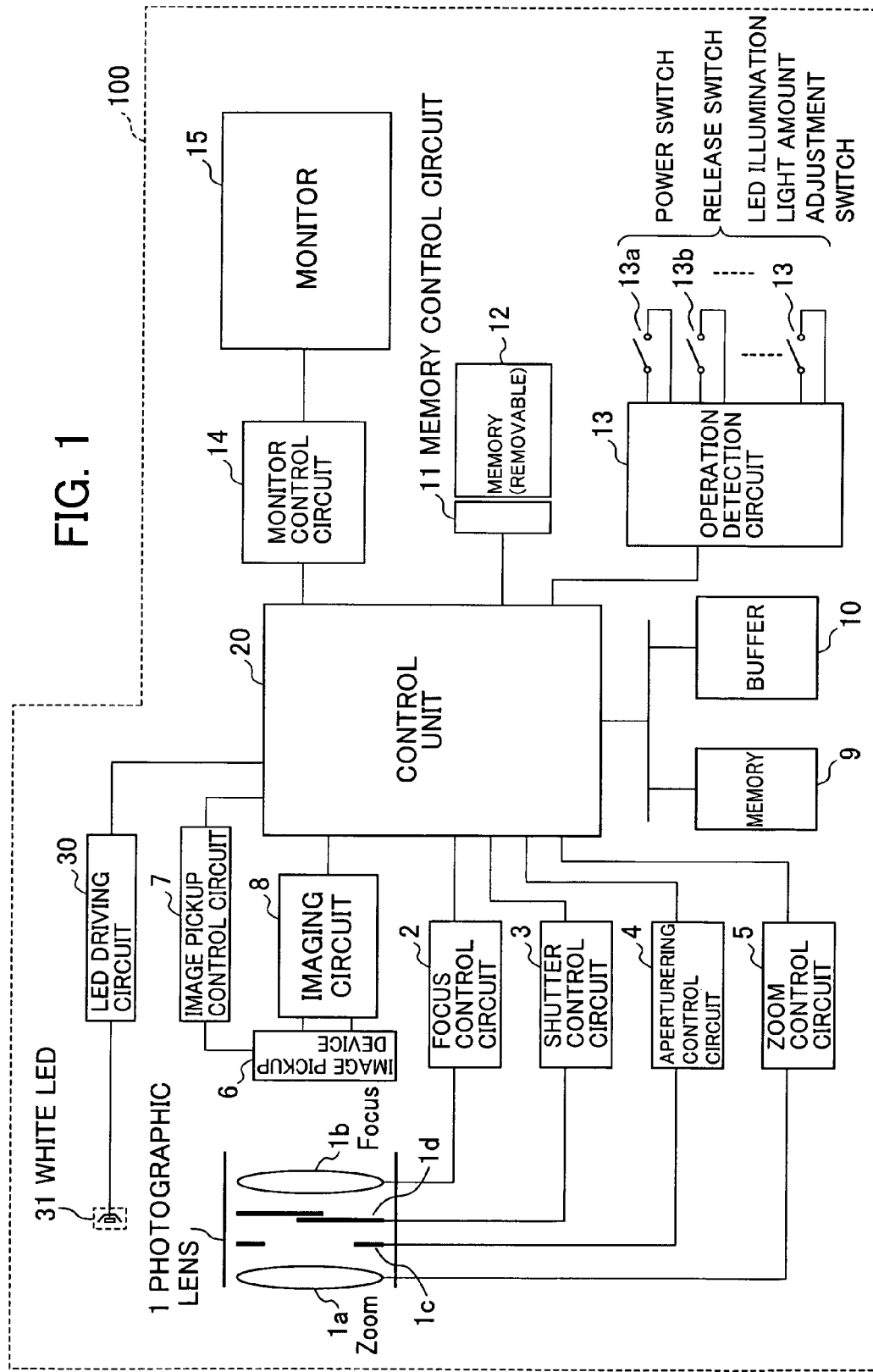
FIG. 1 is a block diagram showing the constitution of the camera of the first embodiment.

FIG. 1 is a block diagram showing the constitution of a camera of this embodiment.

A camera 100 forms an object image at a CCD or CMOS image pickup device 6 via a photographic lens 1.

The photographic lens 1 includes a zoom lens 1a which changes the photographic angle of view, a focusing lens 1b which adjusts the focus point, an aperture ring 1c, and a shutter 1d.

The zoom lens 1a is connected to a zoom control circuit 5, and this zoom control circuit 5 drives the zoom lens 1a and changes the photographic angle of view.

The focusing lens 1b is connected to a focus control circuit 2, and this focus control circuit 2 drives the focusing lens 1b and adjusts the focus point.

The aperture ring 1c is connected to an aperture ring control circuit 4, and this aperture ring control circuit 4 drives the aperture ring and regulates the light amount passing through the photographic lens 1.

The shutter 1d is connected to a shutter control circuit 3, and this shutter control circuit 3 drives the shutter 1d and controls the exposure time.

An image pickup device 6 converts the image formed by the photographic lens 1 into an electric signal.

The image pickup device 6 is connected to an image pickup control circuit 7 and to an imaging circuit 8.

The image pickup control circuit 7 drives the image pickup device 6, controls the exposure time, and controls the conversion of the formed image into an electric signal, the output of the converted electric signal, and the like.

The imaging circuit 8 amplifies the electric signal output from the image pickup device 6, converts it to a digital signal and outputs it to a control unit 20.

A nonvolatile memory 9 is connected to the control unit 20, and stores the programs executed by the control unit 20, photographic data, and the like.

A buffer memory 10 temporarily stores the photographic data, and is used for temporary recording of the processing image data, the processed image data, the compressed image data, and further, other processing of the control unit 20.

A memory control circuit 11 is constituted such that a memory 12 can be inserted and removed, and transfers and records the photographic image files to the memory 12. Further, the memory control circuit 11 can read out information such as image files recorded in the memory 12, and output this to the control unit 20.

A operation detection circuit 13 is connected to the operation switches such as the power switch, the release switch, the LED illumination light amount adjustment switch (13a, 13b, 13c, . . . ) and the like, and when a user operates the camera 100, activating an operation switch, operation information is transmitted from the operation detection circuit 13 to the control unit 20.

A monitor control circuit 14 is connected to a monitor 15 which is an LCD or the like, and along with outputting the display data output from the control unit 20 to the monitor 15, carries out control of turning on or off the lighting of the monitor 15, display control, and displays an image or the like on the monitor 15.

The control unit 20, along with controlling the operation of the camera 100 according to the program stored in the nonvolatile memory 9, carries out processing and reproduce of the photographed images.

The control unit 20, in response to operation of an operation switch, carries out the switching on and off of electric power, the zooming by activation of the zoom control circuit 5, the focusing by activation of the focus control circuit 2, the exposure control by activation of the aperture control circuit 4 and the shutter control circuit 3, and driving of the image pickup device 6 by activation of the image pickup control circuit 7, and inputs the digitized image pickup device output from the imaging circuit 8, and using a buffer memory 10, carries out image processing and compression, and recording in the memory 12. Further, using the buffer memory, the control unit 20 displays on the monitor 15 an image file called from image files recorded in the memory 12, a photographed image file, and image pickup device output of the photograph preliminary stage (through-image).

In the photograph preliminary stage, the shutter 1d is opened, and an image is formed at the image pickup device with the light passing through the photographic lens 1.

The object image formed at the image pickup device 6 is periodically image-processed by the control unit 20, and the object is shown on the monitor 15 in the manner of a moving image.

At the same time, by the control unit 20, the contrast of the image is detected, the focusing lens 1b is moved, the position of the focusing lens with the highest contrast is searched, and the focusing lens is moved to that position, whereby autofocusing is carried out. Further, the luminance level of the image is detected, and automatic exposure control is carried out from the detected luminance level by controlling the aperture ring 1c and the shutter speed (exposure time).

The LED driving circuit 30 turns on and off the lighting of a white LED for illumination 31 (below referred to as LED 31) in response to an instruction signal from the control unit 20, and at the time of photographing, the white LED is turned on to illuminate the object. At this time, the LED driving circuit 30, by controlling the value of the electric current flowing to the LED 31, controls the light emission intensity of the LED 31, and furthermore, by controlling the period (time) of the electric current flow, controls the light emission period (time) of the LED 31. The lighting up of the LED 31, in addition to the above, is also carried out when using the self timer, for red eye-prevention illumination, and when photometry is conducted before the photograph.

Next, the light emission control in the slow synchronization photography mode carried out by the LED driving circuit 30 will be explained. The slow synchronization photography mode is a photography mode wherein strong illumination light and weak illumination light are emitted at their respective times during the exposure, when photographing a single still image by exposing the image pickup device 6 to the object light.

In the slow synchronization photography mode, a plurality of light emission patterns can be provided having differing light emission sequences of the strong light and weak light. Below, several of these provided light emission patterns will be specifically explained with examples.

(Light Emission Pattern A)

Figure 2A:
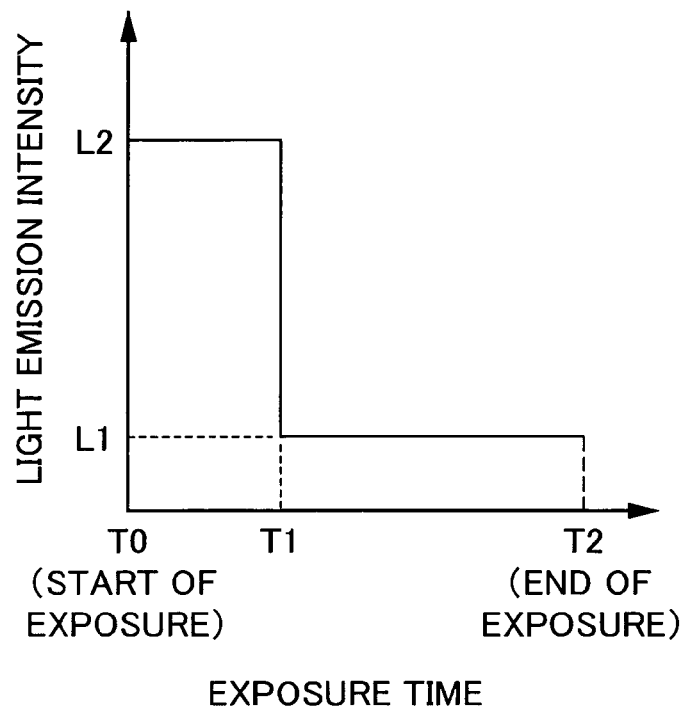
FIG. 2 is a drawing showing a change in light amount and a still image photographed according to light emission pattern A.

FIG. 2A is a timing chart showing the control of a light emission pattern A carried out by the control unit shown in FIG. 1.

T0: Start of Exposure

In the light emission pattern A, the control unit 20 starts the light emission of the LED 31 at approximately the same time as the start of the exposure. The light emission intensity L2 at this time is not particularly limited, but for example high intensity light emission is carried out at about the same level as the highest light emission intensity which is possible for the LED 31. Further, the LED 31 carries out light emission maintaining an approximately constant light emission intensity L2 (continuous illumination).

T1: Switching of Light Emission Intensity

With the elapse of, for example, about ⅓ of the set exposure time, the control unit 20 makes the LED 31 illuminate with a light emission intensity L1 of, for example, about ⅕ of the light emission intensity L2. The LED 31 at this time carries out light emission (continuous light emission) maintaining an approximately constant light emission intensity L1.

T2: End of Exposure

Once the preset exposure time has elapsed, the control unit 20 stops the light emission of the illumination light by the LED 31.

In this way, the light emission pattern A carries out control by switching the light emission intensity depending on the elapsed time so as to carry out light emission with a relatively strong light emission intensity L2 immediately following the start of the exposure (below referred to as strong light emission), and after a predetermined time has elapsed, carry out light emission with a relatively weak intensity L1 (below referred to as weak light emission).

Figure 2B:
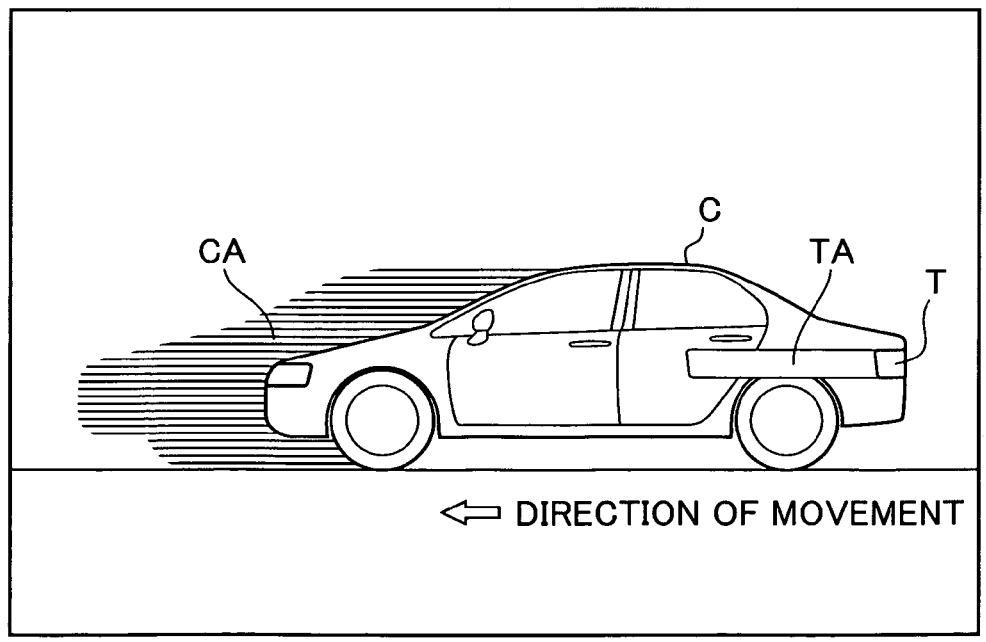

FIG. 2B is an example of a single still image photographed by the light emission pattern A.

The object of the still image shown in FIG. 2B is a car C moving forwards with its tail lights T in a turned on state, in a dark location, for example, outdoors at night. The symbol TA in FIG. 2B is a light beam from the tail lights T.

As shown in FIG. 2B, when a photograph is made in the slow synchronization photography mode of pattern A, the portion C recorded during the strong light emission and the portion CA recorded during the weak light emission are recorded together in a single still image.

The LED 31 carries out strong light emission during the time T0-T1 after the start of the exposure, thus the car C is photographed in detail. The time T0-T1 when strong light emission is carried out is a short time about ⅓ of the length of the full exposure, thus the car is photographed in a still state.

In contrast, during the time T1-T2, the LED 31 carries out weak light emission, thus the car C, which is the object, is visible to the extent of its contours, but because the amount of light is insufficient, it is not recorded in detail. Further, the car C, which is the object, is moving at the time of weak light emission, therefore, its image is recorded in a flowing state (CA in the figure). Such an looming and flowing image resembles, for example, an afterimage formed when displaying a moving image with fast movement on a display device with a slow response speed.

In this way, a still image photographed with the slow synchronization photography mode of pattern A, in the same way as if photographed by the publicly known photography method generally called first curtain synchronization mode, will make an image with an expression on movement forwards of the direction of movement, despite being a still image.

Further, the publicly known first curtain synchronization mode carries out light emission of the illumination light (a flash light) immediately following the start of the exposure, but after this light emission, even though the exposure continues, light emission of the illumination light is not carried out, therefore the movement of the car C is expressed only by the light beam (TA) of the tail lights T.

In contrast, the camera 100 of the present embodiment can record not only the light beam TA of the tail lights, but can record a single still image combining a looming and flowing image of the car C itself which is the main object, and a clear image, and thus can more dynamically express the movement of the car C itself.

(Light Emission Pattern B)

Next, the light emission pattern B carried out by the LED driving circuit will be explained.

Figure 3A:
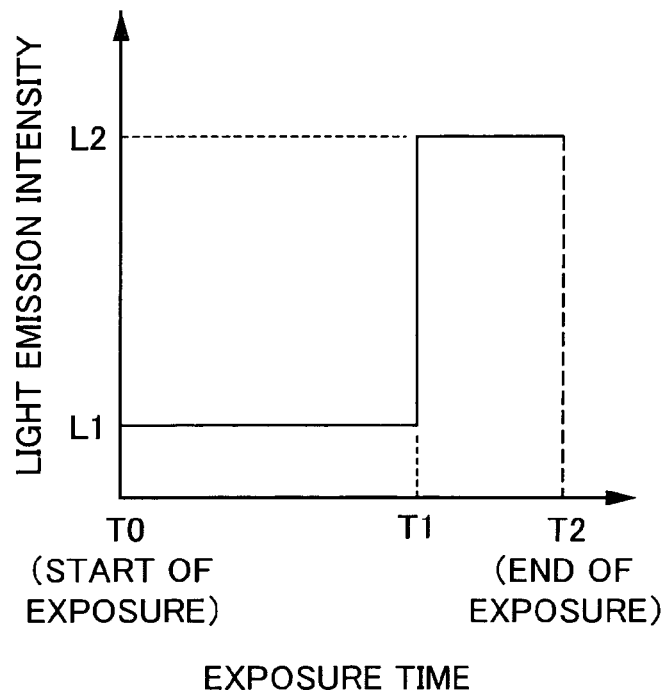
FIG. 3 is a drawing showing a change in light amount and a still image photographed according to light emission pattern B.

FIG. 3A is a timing chart showing the control of the light emission pattern B carried out by the control unit provided in the camera shown in FIG. 1.

T0: Start of Exposure

In the light emission pattern B, the control unit 20 makes the LED 31 continuously emit with weak light emission (L1) at approximately the same time as the start of the exposure.

T1: Switching of Light Emission Intensity

With the elapse of, for example, about ⅔ of the set exposure time, the control unit 20 makes the LED 31 emit with a strong light emission (L2). This strong light emission is carried out for, for example, about ⅓ of the exposure time.

T2: End of Exposure

Once the preset exposure time has elapsed, the control unit 20 stops the light emission of the illumination light by the LED 31.

In this way, the light emission pattern B carries out light emission with a weak light emission at about the same time as the start of the exposure, and after a predetermined time has elapsed, carries out strong light emission.

Figure 3B:
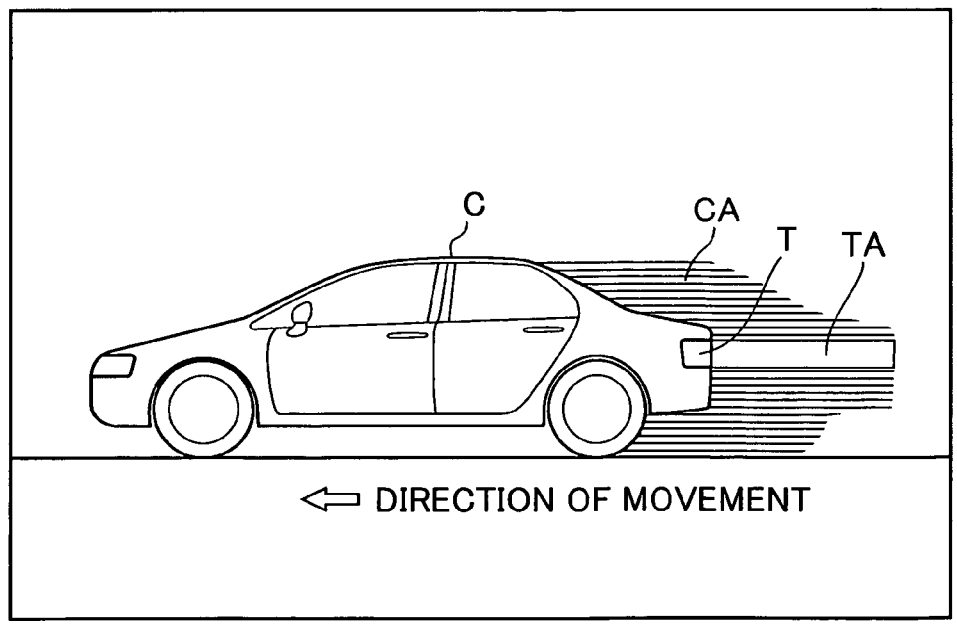

FIG. 3B is an example of a single still image photographed by the light emission pattern B.

The meanings of the symbols in FIG. 3B are the same as in FIG. 2B. Further, while this is not a particular limitation, in the following drawings the meanings of all the symbols are the same as in FIG. 2B.

The light emission pattern B carries out weak light emission during the time T0-T1 after the start of the exposure. In the portion CA recorded in the weak light emission time, as shown in FIG. 3B, the car C is recorded in a looming and flowing state. In contrast, in the portion C recorded in the strong illumination time, the car C is clearly recorded.

In the light emission pattern A, a looming and flowing image is formed forwards of the direction of movement of the car C, whereas in the light emission pattern B, a looming and flowing image CA is formed to the rear of the direction of movement of the car C. In this way, in the light emission pattern B, an image having an expression of movement to the rear of the direction of movement of the car C can be photographed along with the light beam TA of the tail lights T.

The camera 100 provides a plurality of light emission patterns in addition to the above explained light emission patterns A and B as slow synchronization photography modes.

Table 1 is a table showing the light emission patterns of the LED for the case of carrying out photography with the slow synchronization photography modes using the camera shown in FIG. 1.

the start time and end time during the exposure, and in the area between these clear images, a looming and flowing image CA is formed.

Figure 4A:
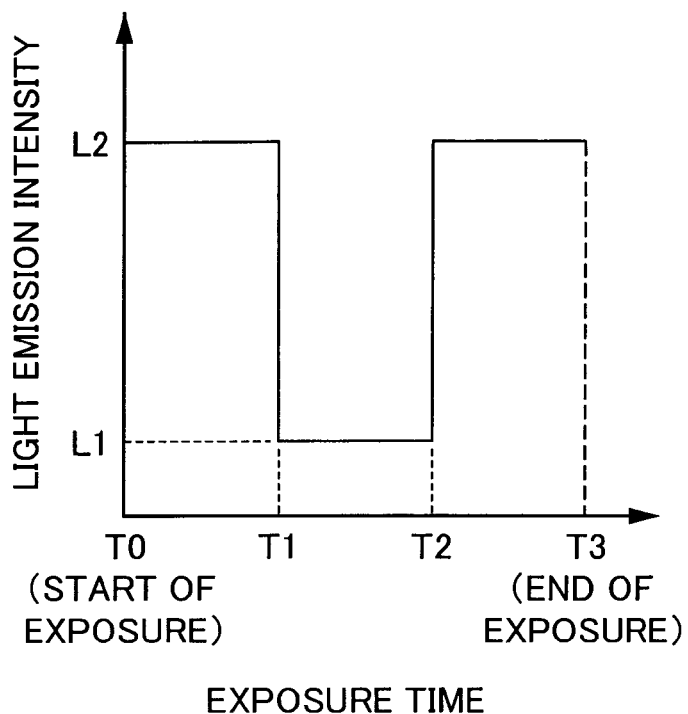
FIG. 4 is a drawing showing a change in light amount and a still image photographed according to light emission pattern C.

Further, in the light emission pattern C shown in FIG. 4A, the light emission intensity is made to be L2 during the time period T0-T1 and the time period T2-T3 (they are made the same), but this is not a limitation. For example, the light emission intensity of the time period T2-T3 could be different from the light emission intensity L1 of the time period T1-T2.

(Light Emission Pattern D)

Figure 5A:
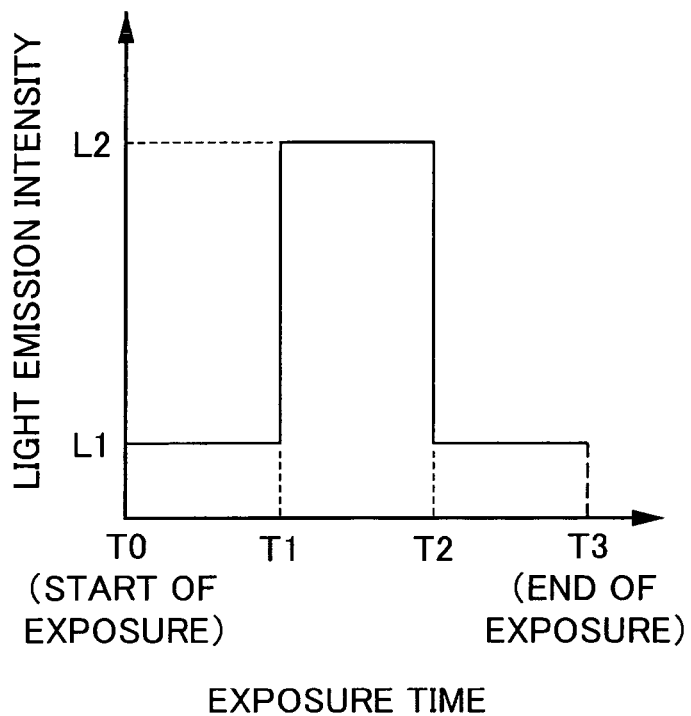
FIG. 5 is a drawing showing a change in light amount and a still image photographed according to light emission pattern D.

The light emission pattern D shown in FIG. 5A is a light emission pattern which carries out light emission in the order of weak light emission, strong light emission, and weak light emission, depending on the elapsed time from the start of the exposure.

Figure 5B:
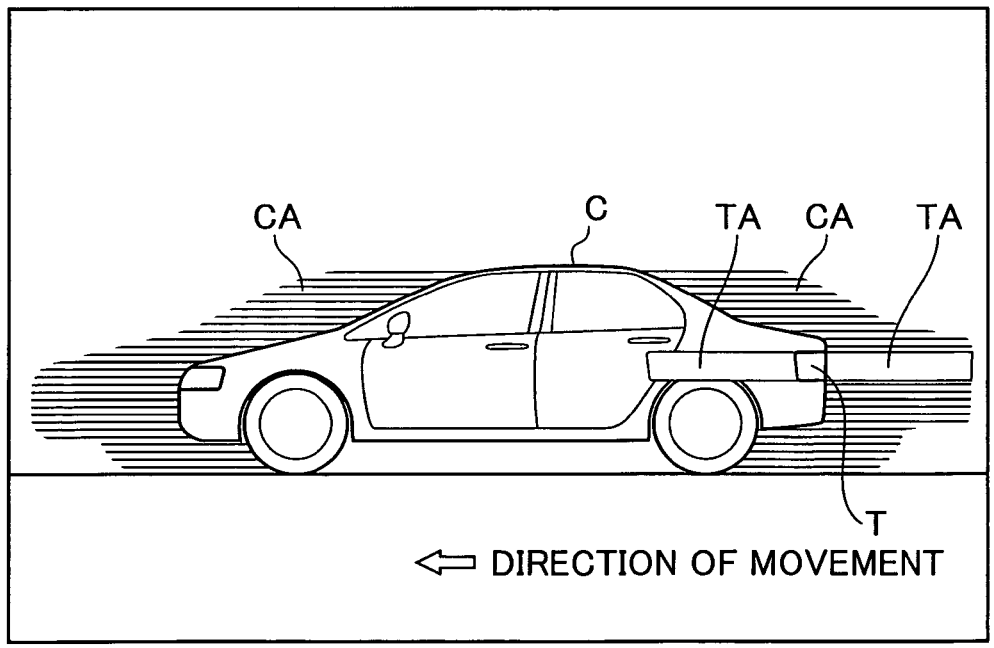

As shown in FIG. 5B, in an image photographed with the light emission pattern D, a clear image of the car C is recorded in the center, and looming and flowing images of the car C are formed both forwards and to the rear of the direction of movement of the car C.

(Light Emission Pattern E)

Figure 6A:
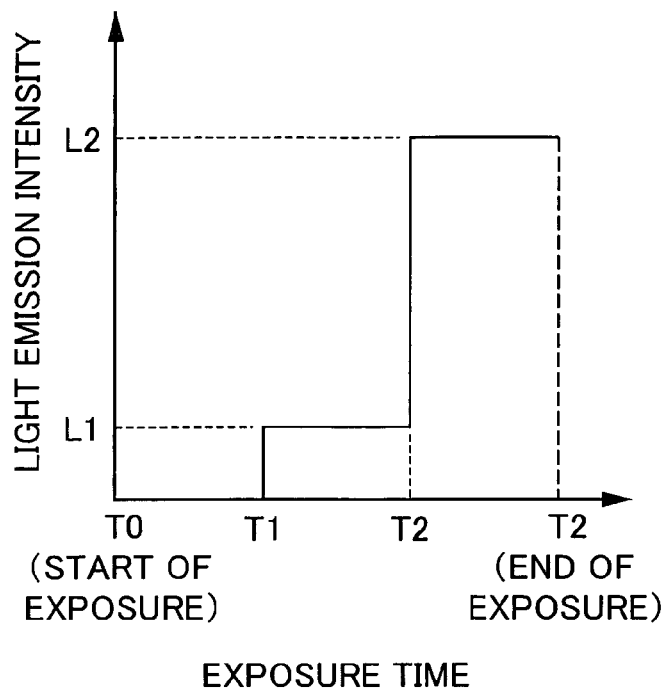
FIG. 6 is a drawing showing a change in light amount and a still image photographed according to light emission pattern E.

The light emission pattern E shown in FIG. 6A is a light emission pattern which does not carry out light emission directly following the start of the exposure, and then depending on the elapsed time, carries out light emission in the order of weak light emission and strong light emission. The time of

TABLE 1

|  | T0-T1 | T1-T2 | T2-T3 | T3-T4 | T4-T5 | Sense of Motion Effect |
|---|---|---|---|---|---|---|
| Light Emission Pattern A | Strong light emission | Weak light emission | | | | Front-curtain synchronization type |
| Light Emission Pattern B | Weak light emission | Strong light emission | | | | Rear-curtain synchronization type |
| Light Emission Pattern C | Strong light emission | Weak light emission | Strong light emission | | | Special effect |
| Light Emission Pattern D | Weak light emission | Strong light emission | Weak light emission | | | Special effect |
| Light Emission Pattern E | No light emission | Weak light emission | Strong light emission | | | Special effect |
| Light Emission Pattern F | Weak light emission 1 | Weak light emission 2 | Strong light emission | | | Special effect |
| Light Emission Pattern G | Strong light emission | Weak light emission | Strong light emission | Weak light emission | Strong light emission | Special effect |
| Light Emission Pattern H | Strong light emission (white) | Weak light emission (red) | | | | Special effect |

The light emission patterns A and B have already been explained, thus their explanations will be omitted.

(Light Emission Pattern C)

The light emission pattern C shown in FIG. 4A is a light emission pattern which carries out light emission in the order of strong light emission, weak light emission, and strong light emission, depending on the elapsed time from the start of the exposure. The light emission times are set so that each of the two strong light emissions is for example about ⅓ of the total exposure time, and the weak light emission is for example, about ⅓ of the total exposure.

Figure 4B:
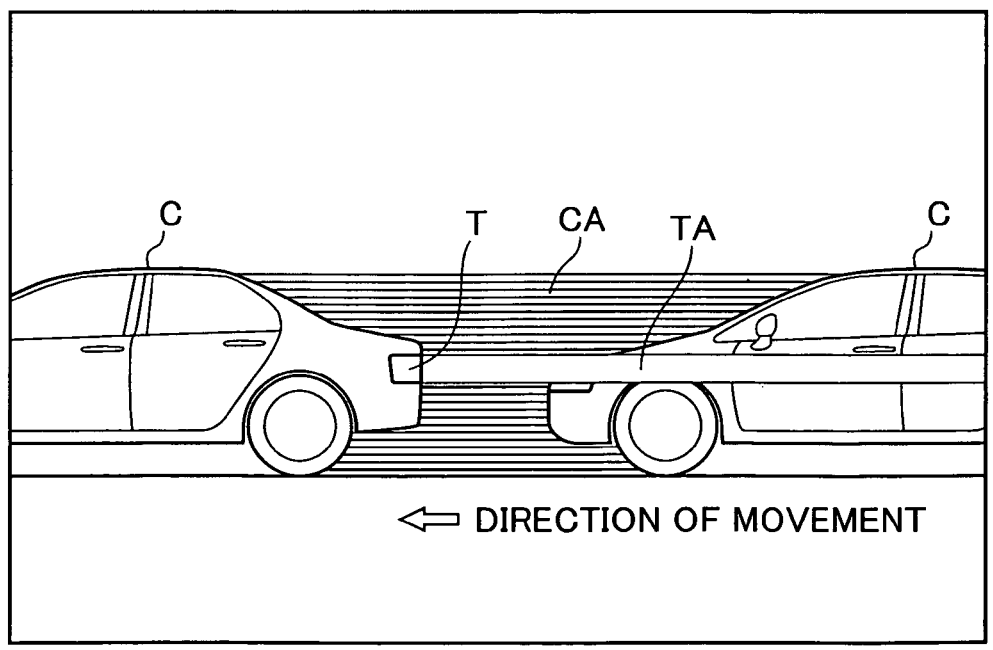

As shown in FIG. 4B, in an image photographed with the light emission pattern C, the car C is clearly photographed at no light emission and weak light emission are each, for example, set to about ⅓ of the total exposure time, and the time of the strong light emission is set to, for example, about ⅓ of the total light emission time.

Figure 6B:
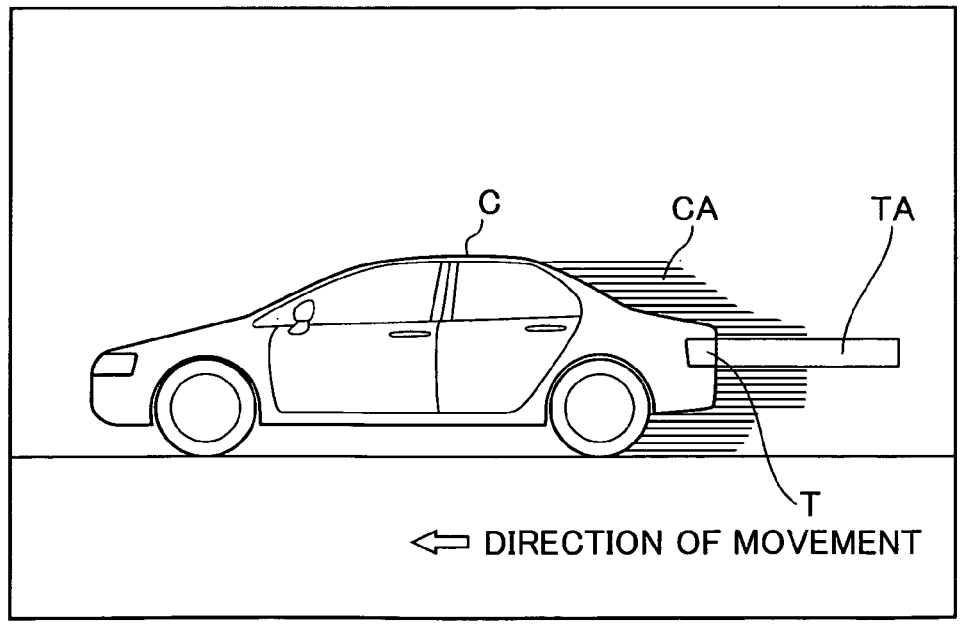

As shown in FIG. 6B, in an image photographed with the light emission pattern E, in the time period during which light emission by the illuminating light of the LED 31 is not carried out (T0-T1), the tail lights are recorded as a light beam TA.

Further, weak light emission is carried out during the time T1-T2, and strong light emission is carried out during the time T2-T3, thus it is possible to record an image similar to that of the light emission pattern B.

(Light Emission Pattern F)

The light emission pattern F carries out a first weak light emission during the time T0-T1 directly following the start of the exposure, and a second weak light emission during the time T1-T2. Further, during the time T2-T3, strong light emission is carried out. The light emission intensity of the first weak light emission is, for example, set to about ⅕ of the strong light emission, and the light emission intensity of the second weak light emission is, for example, set to about ½ of the strong light emission. The time for carrying out the strong light emission is, for example, about ⅓ of the total exposure time, and the times for carrying out the first and second weak light emissions are each, for example, about ⅓ of the total exposure time.

Figure 7A:
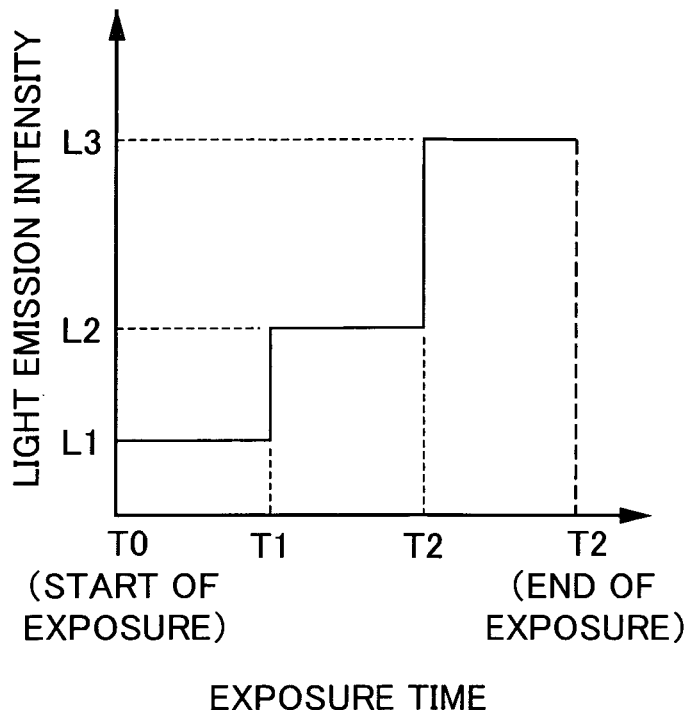
FIG. 7 is a drawing showing a change in light amount and a still image photographed according to light emission pattern F.
Figure 7B:
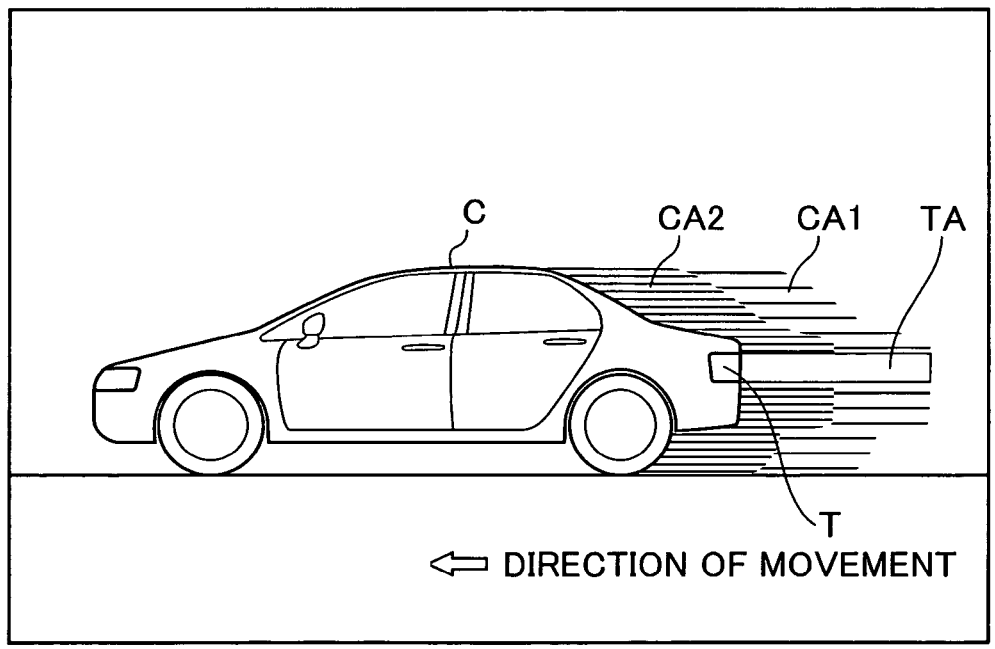

As shown in FIG. 7B, in an image photographed with the light emission pattern F, two levels of looming and flowing images CA1 and CA2 are formed to the rear of the direction of movement of the car C. In an image photographed by this light emission pattern F, the image becomes increasingly looming along the direction of movement of the car C, thus the movement of the car can be expressed in more detail.

(Light Emission Pattern G)

In the light emission pattern G (the timing chart and photographed image for the light emission pattern G are not shown in the drawings), the total exposure time is divided into, for example, about 5 equal parts, and strong light emission and weak light emission are alternated. In this pattern G, the strong light emission is carried out 3 times, thus in the photographed image, a clear car will be recorded at 3 positions, and looming and flowing images will be formed between these clear images.

(Light Emission Pattern H)

In the light emission pattern H (the timing chart and photographed image for the light emission pattern H are not shown in the drawings), in the same way as for the light emission pattern A, control is carried out to switch from strong light emission to weak light emission during the exposure, but it differs from light emission pattern A in the point that the color of the illumination light is changed for the weak light emission time and the strong light emission time.

The LED 31 is formed of a combination of 3 color LED's; R (red), G (green), and B (blue), and in the light emission pattern H, light emission is carried out suitably combining these 3 color LED's. In this light emission pattern H, for example, red illumination light is irradiated during the weak light emission time, and white illumination light is irradiated during the strong light emission time.

This control for switching the color (color temperature) of the illumination light depending on changes in the light emission intensity can also be applied to the light emission patterns B to G.

The camera 100 of the present embodiment can photograph with a countless number of light emission patterns in addition to the above explained light emission patterns A to H by suitable combinations of non-light emission, weak light emission, strong light emission, and the color temperature of the light emission.

Further, the times for carrying out the non-light emission, weak light emission, and strong light emission can be arbitrarily changed. Furthermore, in the case of carrying out the weak light emission a plurality of times, the intensity of each light emission can be changed.

Next, the light emission control carried out by the control unit 20 carried out when photographing in the slow synchronization photography mode will be explained. Herein, the explanation will be given for the control when carrying out light emission with the light emission pattern A, as an example.

FIG. 8 is a flowchart showing the light emission control carried out by the control unit.

The photographer selects one of the light emission patterns provided in advance, and carries out the input operation, and the control unit 20 detects this (step S01). When the control unit 20 detects the "on" operation of the release switch by the photographer (step S02), in response, it starts the execution of the photograph (step S03).

The control unit 20 drives the shutter 1d to the open position (step S04), and object light is exposed onto the image forming surface of the image pickup device 6. The image pickup device 6 converts the object light into an electric signal, and this electric signal is converted into image data in the imaging circuit 8 and saved in the buffer 10.

The control unit 20 controls the LED driving circuit 30 and starts the light emission of the LED 31 at the same time as the start of the exposure (step S05).

The LED 31 carries out continuous light emission with a light emission intensity L1 (weak light emission) during the time from the start of the exposure (T0) until a predetermined time (T1) has elapsed (step S06). After this predetermined time has elapsed, the LED 31 carries out continuous light emission with a light emission intensity L2 (strong light emission, step S07). The LED carries out the strong light emission until a predetermined time (T2) has elapsed (step S08).

When the preset exposure time has finished, the LED 31 stops the light emission (step S09), and the control unit 20, at approximately the same time, drives the shutter 1d to a closed position and the taking of the photograph is finished (step S10).

According to the camera 100 of the first embodiment explained above, the following effects can be obtained.

(1) By switching between a weak light emission and a strong light emission depending on the elapsed time, an object having movement is photographed, thus an image with an expression of movement can be photographed.

(2) By changing the order of the strong light emission and the weak light emission, it is possible to optionally photograph an image having an expression of movement forwards of the direction of movement, or a still image having an expression of movement to the rear.

(3) It is possible to plural record images which are clearly recorded in a single still image, thus the starting point, end point and arbitrary positions in the progress between them of the object movement can be expressed in detail. This photography pattern is suitable for photographing a baseball pitch form, golf swing, or the like.

(4) The color of the illumination light emitted by the LED 31 during the exposure can be changed, thus the image can be made more impressive.

Second Embodiment

Next, the second embodiment of a photographic device to which the present invention is applied will be explained. In this second embodiment and other embodiments explained below, the parts which have the same function as for the above-explained first embodiment have the same reference numbers, or reference number having the same endings, and overlapping explanations and drawings are omitted where appropriate.

FIG. 9 is a block diagram showing the constitution of the camera of the second embodiment.

A camera 200 of the second embodiment has mounted thereon, via an adapter 53, an illumination device for photography 50 of a removable clip-on (external) type.

A control unit 20 of the camera 200 controls a LED driving circuit 51 by carrying out communication with the illumination device for photography 50 via the adapter 53, and makes a LED 52 emit in the same way as in the first embodiment. The LED 52 carries out light emission of the illumination light synchronously with the driving timing of a shutter 1d. The control carried out by the control unit 20 of the camera 200 of the second embodiment is essentially the same as that of the control unit 20 of the camera 100 of the first embodiment, thus an explanation thereof will be omitted. When carrying out photography using the camera 200 of the second embodiment, it is possible to photograph images having a movement in the same way as for the first embodiment.

Third Embodiment

Figure 10:
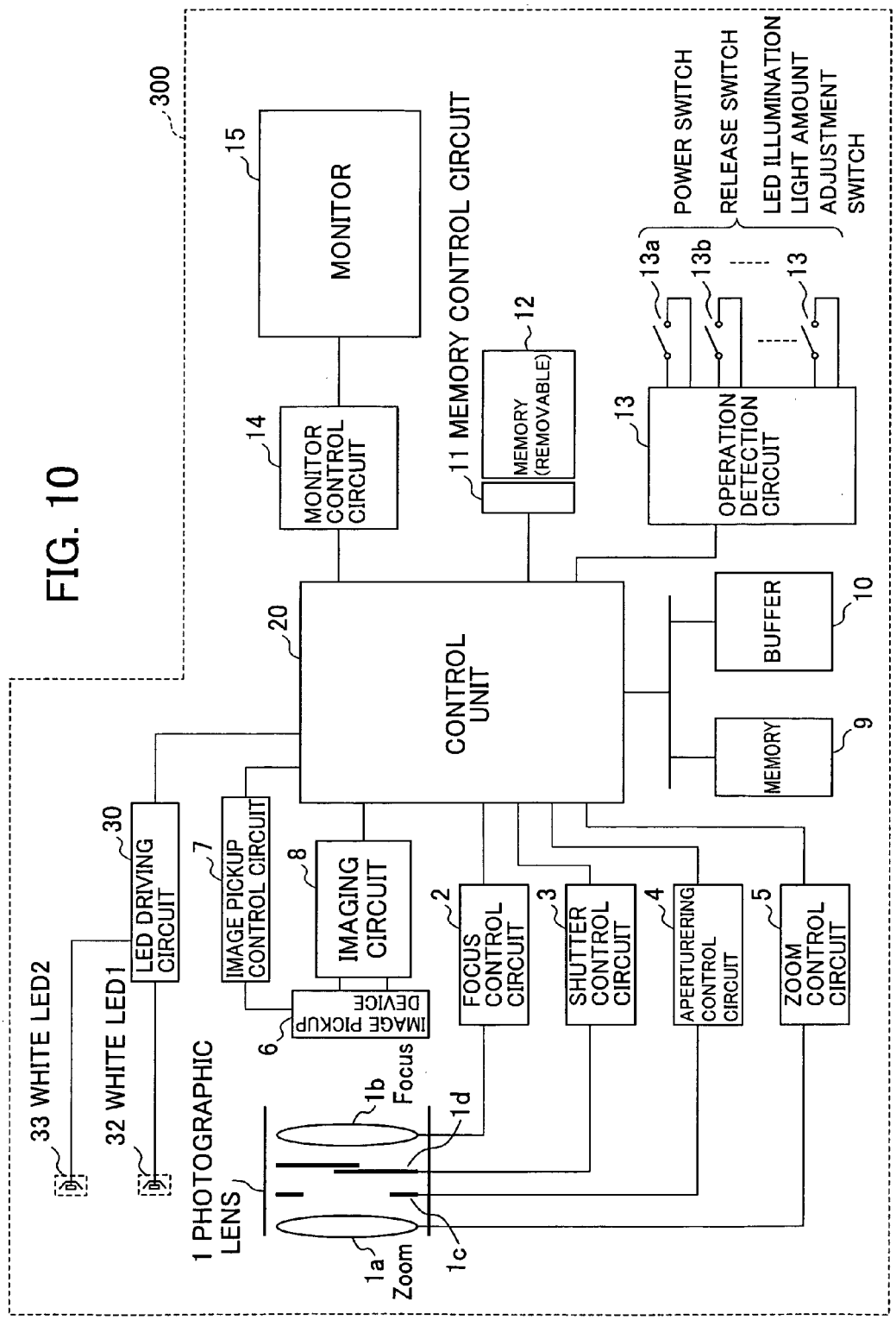
FIG. 10 is a block diagram showing the constitution of the camera of the third embodiment.

FIG. 10 is a block diagram showing the constitution of the camera of the third embodiment.

The camera 300 of the third embodiment is provided with two LED's 32 and 33. The first LED 32 has a greater rated capacity than the second LED 33, and is used solely when carrying out strong light emission. On the other hand, the second LED 33 is used solely when carrying out weak light emission. The control carried out by the control unit 20 when photographing is essentially the same as for the first embodiment, thus an explanation thereof is omitted.

The camera 300 of the third embodiment, in addition to the effects of the first embodiment, is provided with specialized LED's for carrying out strong light emission and weak light emission, and thus can respond quickly when switching the light emission intensity, and is suitable for the case of frequently switching the light emission intensity.

Fourth Embodiment

Figure 11:
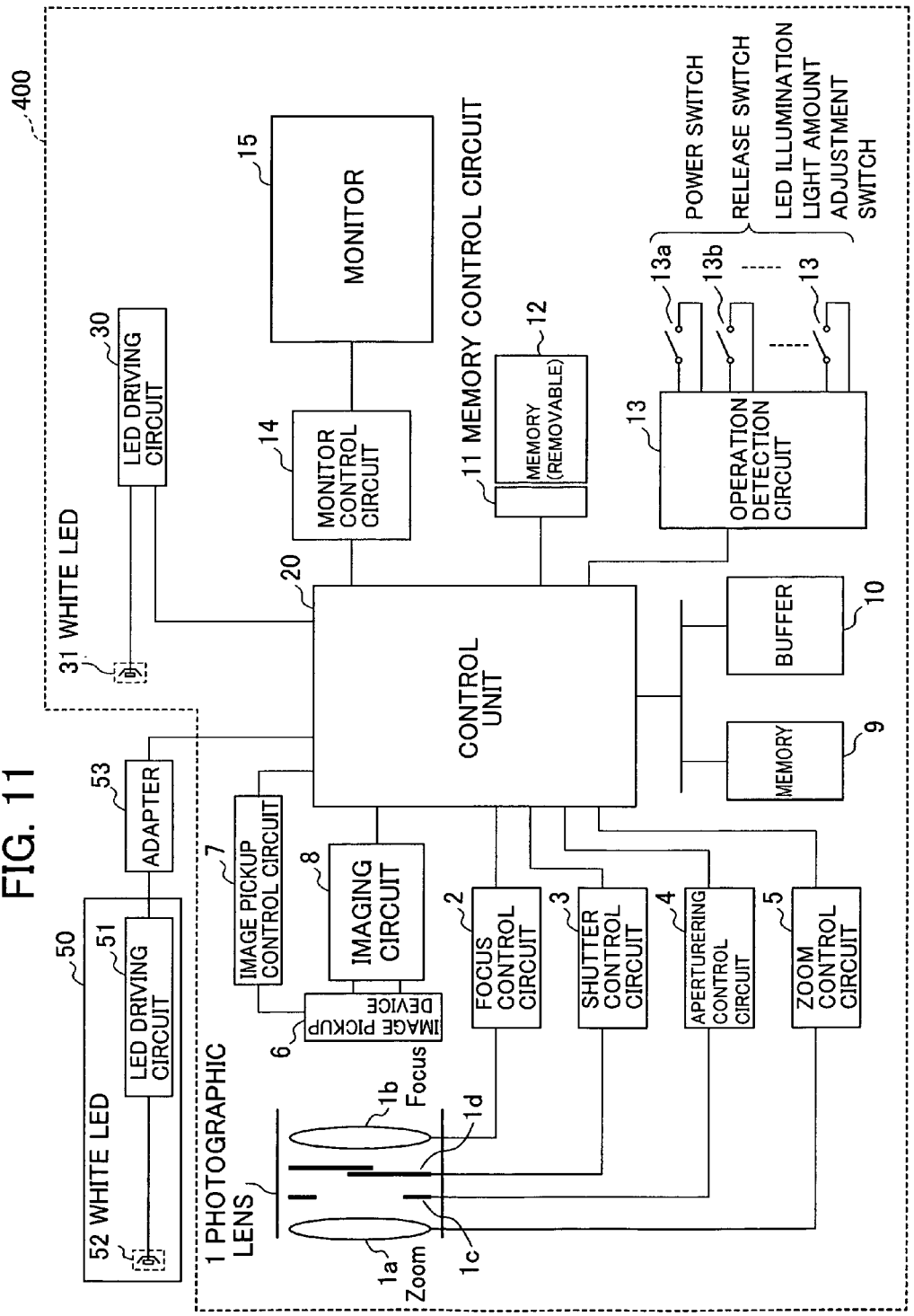
FIG. 11 is a block diagram showing the constitution of the camera of the fourth embodiment.

FIG. 11 is a block diagram showing the constitution of the camera of the fourth embodiment.

The camera 400 of the fourth embodiment is provided with a built-in LED 31 in the same way as the first embodiment, and further an illumination device for photography 50 of the clip-on type is mountable thereon, as in the second embodiment.

The clip-on type illumination device for photography 50 mounted on the camera 400 of the fourth embodiment has a greater rated capacity than the built-in LED 31 and is used solely when carrying out strong light emission. On the other hand, the built-in LED 31 is used solely when carrying out weak light emission. The control carried out by the control unit 20 when photographing is a combination of those of the first embodiment and second embodiment, thus an explanation thereof is omitted. The camera 400 of the fourth embodiment can also provide the same effects as the camera 300 of the third embodiment.

Modifications

The present invention is not limited to the above explained embodiments, and as shown below many modifications and alterations are possible, and these are also included within the technical scope of the invention.

(1) The camera of the embodiments is provided with an LED as an light emitting element, but is not limited to this, and it may be provided with a xenon lamp or the like.

(2) The camera of the embodiments carries out continuous light emission with approximately constant light emission amounts of both the weak light emission and the strong light emission, but is not limited to this, and may, for example, carry out control so that the light emission amount changes linearly depending on the elapsed time.

(3) The camera of the embodiments is a digital camera, but is not limited to this and can be a film camera using a silver halide film as the imaging unit.

(4) The illumination device for photography of the present invention, in the embodiments, was a camera providing an imaging unit and the like, but is not limited to this, and may be an illumination-only illumination device for photography which does not provide an imaging unit.

What is claimed is:

1. An illumination device configured to be used for taking a still photograph, the device comprising:
   a light emission unit which emits, continuously and at an approximately constant light emission amount, illumination light for photography; and
   a light emission control unit which controls the light emission unit and changes a light emission intensity of the illumination light during the acquisition of a single still image by exposing light of an object on an imaging unit provided in a photographic device, wherein
   the light emission control unit, during the acquisition of the single still image, causes the illumination light to emit continuously at a first light emission intensity in a first time period, and causes the illumination light to emit continuously at a second light emission intensity lower than the first light emission intensity in a second time period after the elapse of the first time period, and
   the light emission control unit changes the light emission intensity without a time gap between the first light emission intensity and the second light emission intensity.

2. The illumination device according to claim 1, wherein the light emission unit comprises a first light emission unit which is capable of emitting the illumination light at the first light emission intensity, and a second light emission unit which is capable of emitting the illumination light at the second light emission intensity, and
   the light emission control unit causes either of the first light emission unit and the second light emission unit to emit.

3. The illumination device according to claim 1, wherein the light emission control unit, during the acquisition of the single still image, causes the illumination light to emit continuously with a light emission intensity which differs from the second light emission intensity, in a third time period after the elapse of the second time period.

4. The illumination device according to claim 1, wherein the light emission unit is provided such that a plurality of different colors are selectable as a color of the emitted illumination light, and
   the light emission control unit also changes the color of the illumination light when the light emission control unit changes the light emission intensity of the illumination light.

5. The illumination device according to claim 1, wherein the light emission unit comprises a light emitting diode as a light emitting element.

6. A photographic device comprising the illumination device according to claim 1.

7. A photographic device to which an illumination device configured to be used for taking a still photograph which emits illumination light for photography at an approximately constant light emission amount can be connected, comprising:
   a communication unit which carries out communication with the connected illumination device for photography; and a light emission control unit which controls the illumination device for photography via the communication unit, and changes a light emission intensity of the illumination light during the acquisition of a single still image by exposing light of an object on an imaging unit, wherein the light emission control unit, during the acquisition of the single still image, causes the illumination light to emit continuously at a first light emission intensity in a first time period, and causes the illumination light to emit continuously at a second light emission intensity lower than the first light emission intensity in a second time period after the elapse of the first time period, and the light emission control unit changes the light emission intensity without a time gap between the first light emission intensity and the second light emission intensity.

8. A photographic device to which an illumination device for photography which emits illumination light for photography can be connected, comprising:

a communication unit which carries out communication with the connected illumination device for photography;

a built-in illumination device for photography which is capable of emitting illumination light for photography at a different light emission intensity from the connected illumination device for photography; and a light emission control unit provided to be capable of controlling the connected illumination device for photography and the built-in illumination device for photography, and by causing either of the connected illumination device for photography and the built-in illumination device for photography to emit, changes a light emission intensity of the illumination light during the acquisition of a single still image by exposing light of an object on an imaging unit, wherein, the connected illumination device for photography and the built-in illumination device for photography are each capable of emitting the illumination light continuously and at an approximately constant emission amount, the light emission control unit, during the acquisition of the single still image, causes one of the connected illumination device for photography and the built-in illumination device for photography to emit the illumination light continuously at a first light emission intensity in a first time period, and causes the other one of the connected illumination device for photography and the built-in illumination device for photography to emit the illumination light continuously at a second light emission intensity lower than the first light emission intensity in a second time period after the elapse of the first time period, and the light emission control unit changes the light emission intensity without a time gap between the first light emission intensity and the second light emission intensity.

* * * * *